United States Patent [19]

Itoga et al.

[11] Patent Number: 5,670,124

[45] Date of Patent: Sep. 23, 1997

[54] NITROGEN-CONTAINING MOLECULAR SIEVING CARBON, A PROCESS FOR PREPARING THE SAME AND USE THEREOF

[75] Inventors: Kiyoshi Itoga, Hyogo; Yoshio Tsutsumi, Osaka; Masanori Tsuji, Hyogo; Ayako Tatebayashi, Osaka, all of Japan

[73] Assignee: Takeda Chemical Industries, Ltd., Osaka, Japan

[21] Appl. No.: 609,928

[22] Filed: Feb. 29, 1996

[30] Foreign Application Priority Data

Mar. 1, 1995 [JP] Japan ................... 7-042042

[51] Int. Cl.$^6$ ................... C01B 21/00
[52] U.S. Cl. ................... 423/239.1; 423/460; 423/445 R; 423/384; 423/235
[58] Field of Search ................... 423/235, 460, 423/445 R, 384, 239.1

[56] References Cited

U.S. PATENT DOCUMENTS

| | | | |
|---|---|---|---|
| 3,953,345 | 4/1976 | Saito et al. | 252/423 |
| 4,118,341 | 10/1978 | Ishibashi et al. | 252/438 |
| 4,285,831 | 8/1981 | Yoshida et al. | 252/423 |
| 5,352,370 | 10/1994 | Hayden | 210/763 |

FOREIGN PATENT DOCUMENTS

| | | |
|---|---|---|
| 0 490 317 A1 | 6/1992 | European Pat. Off. |
| 47-38686 | 12/1972 | Japan . |
| 49-64568 | 6/1974 | Japan . |
| 49-69549 | 7/1974 | Japan . |
| 49-37036 | 10/1974 | Japan . |
| 57-106516 | 7/1982 | Japan . |
| 59-45914 | 3/1984 | Japan . |
| 5-76753 | 3/1993 | Japan . |
| 90/09227 | 8/1990 | WIPO . |

OTHER PUBLICATIONS

Patent Abstracts of Japan, vol. 3, No. 87 (C-053) & JP-A-54 064091 (Toho Rayon) * abstract *.

B. Stohr, H.P. Boehm, and R. Schlogl, Carbon 29(6), pp. 707-720, 1991.

J. Wang and W. Xie, Ciuhua Xuebao 10(4), pp. 357-363, 1989.

Primary Examiner—Deborah Jones
Assistant Examiner—Amy M. Harding
Attorney, Agent, or Firm—Wenderoth, Lind & Ponack

[57] ABSTRACT

A nitrogen-containing molecular sieving carbon which contains at least 0.1 weight % nitrogen bonded to constituent carbon of the activated carbon. It exhibits improved ability to remove nitrogen oxides compared with the conventional adsorption methods using commercially available activated carbons or other absorbents. Also an economically advantageous system for removing nitrogen oxides is provided which needs no reducing agent such as ammonia, no oxidizing agent such as ozone, or no electrical and physical energy such as electron rays or ultraviolet light in its operation, needs no expensive catalysts, and can be semi-permanently operated with regular changes of the relatively low-priced activated carbon.

4 Claims, No Drawings

NITROGEN-CONTAINING MOLECULAR SIEVING CARBON, A PROCESS FOR PREPARING THE SAME AND USE THEREOF

BACKGROUND OF THE INVENTION

1. Field of the Invention

The present invention relates to a nitrogen-containing molecular sieving carbon (carbon molecular sieves), a process for preparing the same and use thereof, and more particularly, to a nitrogen-containing molecular sieving carbon which exhibits excellent activity for removing harmful substances such as nitrogen oxides, a process for preparing the same and use thereof.

2. Description of Related Art

Activated carbon, having well-developed porous structure and exhibiting the ability to selectively adsorb or catalytically oxidize harmful substances contained in fluid in low concentration, is widely used as an agent for controlling environmental pollution such as air pollution, water pollution and bad smell.

There has been known ordinary activated carbon activated by water vapor, carbon dioxide gas or the like; the adsorbent made of porous carbon material having pores with diameters of 4 to 10 angstrom at $0.05 cm^3/g$ proposed in Japanese Unexamined Patent Publication Hei 5(1993)-76753; the activated carbon contacted with ammonia gas and the activated carbon prepared by the use of a nitrogen-containing carbon source which is proposed in Japanese Unexamined Patent Publications Sho 49(1974)-64568, Sho 49(1974)-69549 and Sho 57(1982)-106516. However, these are still unsatisfactory for practical use in the ability to remove acidic gas such as sulfur dioxide, nitrogen oxides, hydrogen sulfide and mercaptan, especially $NO_x$, contained in gas.

For purifying gas which contains nitrogen oxides, other techniques are also known such as the ultraviolet light method, the absorption method, the electron ray irradiation method and the like. The ultraviolet light and electron ray irradiation methods, however, use complicated apparatuses and the costs for electrically running them are great. The economical efficiency of the methods as a whole is not considered to be high.

The adsorption method using the above-mentioned adsorbent or activated carbon is found to be the most economical way if only the adsorptive properties of the adsorbent improve, because the method does not need any reducing agents such as ammonia to be added into the apparatus during adsorptive removal or any hazardous substances such as ozone and the purifying activity can be semipermanently maintained by changing the adsorbent at regular intervals. Therefore, there is a rising demand for an inexpensive adsorbent which exhibits an excellent adsorbability for removing the harmful gas safely.

SUMMARY OF THE INVENTION

The present invention provides a nitrogen-containing molecular sieving carbon which contains at least 0.1 weight % nitrogen bonded to constituent carbon of the molecular sieving carbon.

Further, the present invention provides a process for preparing the nitrogen-containing molecular sieving carbon by contacting a molecular sieving carbon with ammonia or an amine at a temperature within the range from 100° to 1200° C. or by calcining (i.e., carbonizing, activating and controlling porosity) a mixture of a material for a molecular sieving carbon and a nitrogen-containing carbon source.

Further, the present invention provides a method for removing by adsorption a nitrogen oxide from gas by contacting the gas with the nitrogen-containing molecular sieving carbon.

Therefore, the inventor, after extended intensive research, has finally succeeded in developing a molecular sieving carbon containing nitrogen in the molecule of the activated carbon by contacting a molecular sieving carbon or a material therefor with ammonia, an amine or the like at a high temperature or by calcining (i.e., carbonizing, activating and controlling porosity) a material for a molecular sieving carbon using a nitrogen-containing carbon source. Also the inventor has found that the nitrogen-containing molecular sieving carbon exhibits the ability to remove acidic gases such as sulfur dioxide, nitrogen oxides, hydrogen sulfide and mercaptan efficiently.

DETAILED DESCRIPTION OF THE PREFERRED EMBODIMENT

The nitrogen-containing molecular sieving carbon of the present invention has homogeneous micropores with an average diameter within the range from 3 to 10 angstrom, preferably from 3 to 8 angstrom, and the surface area thereof is usually smaller than $900 m^2/g$, preferably from 100 to $800 m^2/g$. The constituent carbon atoms of the molecular sieving carbon are chemically bonded to nitrogen atoms and the molecular sieving carbon contains at least 0.1 weight % nitrogen, preferably from 0.1 to 5 weight % nitrogen, more preferably from 0.1 to 3 weight % nitrogen. The configuration thereof is not specifically limited, but may be pellets, fragments, honeycombs, fibers or the like, among which pellets are preferred. The size is preferably within the range from 1 mmφ to 6 mmφ in particle diameter. Too large or too small a particle diameter is not industrially preferred because the ability to adsorb nitrogen oxides declines when the particle diameter is too large and the pressure loss increases when it is too small.

The nitrogen-containing molecular sieving carbon of the present invention can be prepared by contacting a molecular sieving carbon with ammonia or an amine at a temperature within the range from 100° to 1200° C.

The molecular sieving carbon used as a material is generally called molecular sieve carbon, carbon molecular sieves, molecular-sieving carbon, MSC or CMS which has homogeneous micropores with an average diameter within the range from 3 to 10 angstrom, preferably from 3 to 8 angstrom. The surface area thereof is usually $900 m^2/g$ or below, preferably from about 100 to $800 m^2/g$. The molecular sieving carbon consists of microcrystalline carbon similar to that of ordinary activated carbon, and the properties thereof, for example the source of carbon as a material, the elementary composition, the chemical properties, the selective adsorption of a polar molecule, are similar to those of the ordinary activated carbon. The molecular sieving carbon, can be prepared in a known process such as described in Japanese Unexamined Patent Publication Sho 59(1984)-45914, Sho 47(1972)-38686, or Japanese Examined Patent Publication Sho 49(1974)-37036.

The amines to be contacted with the molecular sieving carbon have at least one nitrogen atom in a molecule, the examples thereof typically including alkylamines having at least one carbon atom such as methylamine, ethylamine, propylamine and hexylamine; dialkylamines having at least two carbon atoms such as dimethylamine, diethylamine, methylethylamine and dipropylamine; trialkylamines having at least three carbon atoms such as trimethylamine, dimethylethylamine, methyldiethylamine and triethylamine; diamines having zero or more carbon atoms such as hydrazine, methylenediamine, ethylenediamine, propylenediamine, hexylenediamine and triethylenediamine; hydroxylamines having at least 1 carbon atom such as methanolamine, ethanolamine, hydroxypro-pylamine, hydroxyhexylamine, diethanolamine and diisopropanolamine; aromatic amines such as aniline and phenylenediamine.

The amount of the ammonia or amine contacted with the molecular sieving carbon is at least 0.1 millimol, preferably 1 millimol or more, per gram of the molecular sieving carbon. The ammonia or amine is preferably used as a mixture with an inert gas such as nitrogen, carbon dioxide, water vapor, combustion exhaust gas and the like as a carrier. The amount of the inert gas mixed with the ammonia or amine is preferably from 0 to 90 vol % with respect to ammonia or amine.

The contact temperature is usually within the range from 100° to 1200° C., preferably from 200° to 1000° C., and the contact time is usually at least 1 minute, preferably from 2 to 600 minutes.

The molecular sieving carbon is contacted with the ammonia or amine in a known method as used conventionally for preparation of activated carbon such as the fixed bed, moving bed, slurry or rotary kiln method.

Further, a nitrogen-containing molecular sieving carbon having more excellent catalytic activity can be obtained by adsorption or impregnation of a small amount of sulfuric acid, nitric acid, ammonium nitrate, ammonium sulfate or the like in activated carbon or by contact of activated carbon with a gas containing oxygen at a temperature within the range from 100° to 400° C., prior to the contact with the ammonia or amine. An activated carbon deteriorated to some extent from being used as an adsorbent, for example in treating exhaust gas, can also be used as a material for the molecular sieving carbon.

Alternatively, the nitrogen-containing molecular sieving carbon of the present invention can be prepared by using a mixture of a material for the molecular sieving carbon and a nitrogen-containing carbon source and calcining (i.e., carbonizing, activating and controlling porosity) it with a known process such as described in Japanese Unexamined Patent Publication Sho 59(1984)-45914, Sho 47(1972)-38686 and Japanese Examined Patent Publication Sho 49(1974)-37036.

The materials for the above molecular sieving carbon are not specifically limited so long as they can be used for producing ordinary activated carbon, the examples thereof typically including carbonized woody materials such as charcoal, coal and coconut shell and liquid or solid resins or resin-base materials such as phenol, polyvinylidene chloride, polyvinyl chloride, melamine, urea, urethane and polyester.

Examples of the above-mentioned nitrogen-containing carbon sources typically include monomers and resins of urea, melamine, acrylonitrile, isocyanate, urethane resin, urea resin, melamine resin and polyacrylonitrile, compounds or polymers having boding groups such as biuret, allophanate, isocyanurate, ureido, monomethylol and dimethylol, the aforesaid amines, and other polyamines.

For mixing the material for the molecular sieving carbon with nitrogen-containing carbon source, any of the following methods may be used; the method wherein both are mixed prior to the carbonization and calcined; the method wherein both are mixed after the carbonization; and the method wherein a carbonized one is mixed with the other which is not yet carbonized. The mixture ratio, though it varies depending upon a desired content of nitrogen, is usually at least 1 part by weight, preferably from 1 to 500 parts by weight with respect to 100 parts by weight of the material for the molecular sieving carbon. The mixing may be directly carried out; or the nitrogen-containing carbon source may be dissolved beforehand in, for example, water, aqueous solution of acid (e.g., aqueous solution of sulfuric acid and aqueous solution of nitric acid), or organic solvent (e.g., ethyl alcohol, diethyl ether, hexane and acetone), and then the solution thus obtained may be impregnated into the material for the molecular sieving carbon, mixed with stir, filtered and dried.

The mixture may be impregnated with a small amount of sulfuric acid, nitric acid, ammonium nitrate, ammonium sulfate or the like, whereby a nitrogen-containing molecular sieving carbon having greater catalytic activity can be obtained.

The above-mentioned mixture is calcined to give the nitrogen-containing molecular sieving carbon. To calcine, here, means to carbonize, activate and control porosity. The calcination is carried out by the same method as in the known calcination for preparing the molecular sieving carbon, preferably carried out by heating to a temperature within the range from 400° to 1200° C. with inert gas such as nitrogen gas, combustion exhaust gas, water vapor and carbon dioxide gas as a carrier.

In addition, it is possible to recover the nitrogen-containing molecular sieving carbon which has been deteriorated from being used for removal by adsorption of nitrogen oxide or other acidic gas; by contacting it with the aforesaid ammonia or amine under heating; or by calcining it after mixing or impregnating it with the nitrogen-containing carbon source. The heating or calcining, in this case, is preferably carried out in an atmosphere of inert gas similar to the above at a temperature within the range from 400° to 1200° C. for a period between 1 to 600 minutes.

According to the present invention, the nitrogen oxide is removed by adsorption from gas containing it by contact of the gas with the above-described nitrogen-containing molecular sieving carbon. The above nitrogen oxides are NO, $NO_2$, $N_2O_4$, $N_2O_3$, $N_2O_5$, $N_2O$ and the like.

In the invention, the gas containing the nitrogen oxide contains about 50 ppm or less, preferably about 20 ppm or less, nitrogen oxide per cubic meter.

For contact with the nitrogen-containing molecular sieving carbon, the gas containing the nitrogen oxide may be sent into a container with a suitable amount of the nitrogen-containing molecular sieving carbon therein, or the gas may be sent through a passageway wherein disposed is the nitrogen-containing molecular sieving carbon formed in a suitable configuration such as honeycombs, cylinders, a filter and the like. Also, any of the presently known contact means such as the fixed bed, fluidized bed and moving bed can be applied.

Preferably, such gas is contacted with the nitrogen-containing molecular sieving carbon at a space velocity of 100,000/hr or slower, more preferably at a space velocity within the range from 100 to 30,000/hr. The contact temperature is preferably 150° C. or below, more preferably 60° C. or below.

EXAMPLES

The following examples will illustrate the nitrogen-containing molecular sieving carbon, the process for preparing the same and the method for removing the nitrogen oxides using the same.

Examples 1

Silica-glass tubes with a diameter of 40 mmφ were each filled with 100 g of cylindrical particles of the molecular sieving carbon A with an average particle diameter of 2.5 mmφ (the average diameter of the pores being 5 angstrom). Nitrogen gas was sent through each of the silica-glass tubes at a linear flow rate of 50 cm/sec for 10 minutes at temperatures of 400° C., 500° C., 600° C., 700° C., 800° C. and 900° C. Then nitrogen gas containing 10% ammonia was sent through at a linear flow rate of 10 cm/sec for 30 minutes and nitrogen gas was again sent through at a linear rate of 50 cm/sec with cooling to room temperature to give the molecular sieving carbons from B to G (of the invention).

As a control, 100 g of cylindrical particles of the molecular sieving carbon H with an average particle diameter of 2.5 mmφ (the average diameter of the pores being 18 angstrom) was filled in a silica-glass tube with a diameter of 40 mmφ. Nitrogen gas was sent through the silica-glass tube at a linear flow rate of 50 cm/sec at a temperature of 600° C. for 10 minutes. Then nitrogen gas containing 10% ammonia was sent through at a linear flow rate of 10 cm/sec for 30 minutes and nitrogen gas was again sent through at a linear rate of 50 cm/sec with cooling to room temperature to give the comparative activated carbon I.

Table 1 shows the nitrogen content of each of the molecular sieving carbons and the activated carbon in the example:

TABLE 1

| Activated carbon | Heat treatment temperature (°C.) | Heat treatment time (minutes) | Nitrogen content (wt %) |
|---|---|---|---|
| Comparative A | — | — | 0.08 |
| Example B | 400 | 30 | 0.52 |
| Example C | 500 | 30 | 0.59 |
| Example D | 600 | 30 | 0.99 |
| Example E | 700 | 30 | 1.18 |
| Example F | 800 | 30 | 1.07 |
| Example G | 900 | 30 | 0.52 |
| Comparative H | — | — | 0.08 |
| Comparative I | 600 | 30 | 0.75 |

Example 2

Each of the molecular sieving carbons from B to G and control activated carbon I obtained in Example 1 was filled in a silica-glass tube with a diameter of 41.0 mmφ so as to have a thickness of 94.5 mm. Blended air containing 10 ppm nitrogen monoxide with a relative humidity of 50% at a temperature of 25° C. was sent through each of the tubes at a linear flow rate of 26.3 cm/sec for testing the removal activity of the nitrogen monoxide. The results are given in Table 2:

TABLE 2

| Activated carbon No. | Measuring temperature (°C.) | % of NO$_x$ removed at each time | | | |
|---|---|---|---|---|---|
| | | 30 mins. | 1 hr. | 2 hrs. | 3 hrs. |
| Comparative A | 25 | 76 | 61 | 56 | 54 |
| Example B | 25 | 100 | 91 | 86 | 75 |
| Example C | 25 | 100 | 93 | 86 | 78 |
| Example D | 25 | 100 | 94 | 88 | 81 |
| Example E | 25 | 100 | 96 | 89 | 86 |
| Example F | 25 | 100 | 94 | 88 | 85 |
| Example G | 25 | 100 | 93 | 83 | 79 |
| Comparative H | 25 | 88 | 68 | 62 | 56 |
| Comparative I | 25 | 91 | 76 | 70 | 62 |

Example 3

10 g, 20 g, 30 g and 40 g of 50 weight % aqueous solution of urea were each sprayed on 100 g of cylindrical particles of the molecular sieving carbon A with an average particle diameter of 2.5 mmφ (the average diameter of the pores being 5 angstrom). Then these were put in an electric drier with the internal temperature kept at 115° C. and dried by dehydration to obtain urea-supported molecular sieving carbons, which were then filled in silica-glass tubes with a diameter of 40 mmφ, calcined with nitrogen gas sent through at a linear flow rate of 50 cm/sec. at a temperature of 600° C. for 2 hours and then cooled to room temperature with nitrogen gas sent through at the same flow rate to give the nitrogen-containing molecular sieving carbons from J to M. Table 3 illustrates the nitrogen contents thereof and the results of the carbon monoxide removal test conducted in the same manner as in Example 2.

TABLE 3

| Activated carbon No. | Nitrogen content (%) | % of NO$_x$ removed at each time | | | |
|---|---|---|---|---|---|
| | | 30 mins. | 1 hr. | 2 hrs. | 3 hrs. |
| Comparative A | 0.08 | 76 | 61 | 56 | 54 |
| Example J | 0.73 | 100 | 93 | 87 | 81 |
| Example K | 1.24 | 100 | 95 | 88 | 83 |
| Example L | 1.81 | 100 | 96 | 91 | 86 |
| Example M | 2.16 | 100 | 98 | 93 | 88 |

Example 4

Activated carbon of coconut shells was pulverized 100mesh of below, to which a small amount of pitch as a binder, water and sulfonic acid lignin were added. 0 g, 500 g, 1000 g, 1500 g and 2000 g of melamine powder were each added to 10 kg of the mixture, which were mixed by kneading and then pressure-formed to give cylindrical particles with an average particle diameter of 2.5 mmφ. The obtained particles were carbonized at 600° C., and further activated at 850° C. in the presence of water vapor to give the molecular sieving carbon A and nitrogen-containing molecular sieving carbons from N to Q with the average diameter of the pores being 5 angstrom. Table 4 illustrates the nitrogen contents thereof and the results of the carbon monoxide removal test conducted under the same conditions as in Example 2.

TABLE 4

| Activated carbon No. | Nitrogen content (wt %) | % of NO$_x$ removed at each time | | | |
|---|---|---|---|---|---|
| | | 30 mins. | 1 hr. | 2 hrs. | 3 hrs. |
| Comparative A | 0.08 | 76 | 61 | 56 | 54 |
| Example N | 1.04 | 100 | 94 | 88 | 82 |

TABLE 4-continued

| Activated carbon No. | Nitrogen content (wt %) | % of NO$_x$ removed at each time | | | |
|---|---|---|---|---|---|
| | | 30 mins. | 1 hr. | 2 hrs. | 3 hrs. |
| Example O | 1.77 | 100 | 96 | 90 | 83 |
| Example P | 2.58 | 100 | 97 | 94 | 88 |
| Example Q | 3.08 | 100 | 99 | 95 | 90 |

The nitrogen-containing molecular sieving carbon of the present invention has improved the ability to remove nitrogen oxides compared with the conventional adsorbing systems using commercially available activated carbons or other adsorbents. It has provided a most economically advantageous system for removing nitrogen oxides which needs no reducing agent such as ammonia, no oxidizing agent such as ozone, or no electrical and physical energy such as electron rays and ultraviolet light during its operation of adsorptive removal of nitrogen oxides, needs no expensive catalysts, and can be semipermanently operated with regular changes of the relatively low-priced activated carbon.

What is claimed is:

1. A nitrogen-containing molecular sieving carbon, which comprises a molecular sieving carbon and 0.1 to 5 weight % nitrogen bonded to constituent carbon atoms of the molecular sieving carbon, and having an average micropore diameter of 3 to 10 Å.

2. A process for preparing the nitrogen-containing molecular sieving carbon according to claim 1, which comprises contacting a molecular sieving carbon with ammonia or amines at a temperature within the range from 100° to 1200° C.

3. A process for preparing the nitrogen-containing molecular sieving carbon according to claim 1, which comprises calcining a mixture of a starting material for producing a molecular sieving carbon and a nitrogen-containing carbon source.

4. A method for removing by adsorption a nitrogen oxide from a gas which comprises contacting the gas with the nitrogen-containing molecular sieving carbon according to claim 1.

* * * * *